(12) United States Patent
Wigdor et al.

(10) Patent No.: US 8,261,212 B2
(45) Date of Patent: Sep. 4, 2012

(54) DISPLAYING GUI ELEMENTS ON NATURAL USER INTERFACES

(75) Inventors: Daniel J. Wigdor, Seattle, WA (US); Paul Armistead Hoover, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 376 days.

(21) Appl. No.: 12/582,156

(22) Filed: Oct. 20, 2009

(65) Prior Publication Data

US 2011/0093821 A1    Apr. 21, 2011

(51) Int. Cl.
    *G06F 3/033* (2006.01)
(52) U.S. Cl. .................................. 715/863; 715/790
(58) Field of Classification Search .................. 715/863, 715/790
    See application file for complete search history.

(56) References Cited

U.S. PATENT DOCUMENTS

| | | | |
|---|---|---|---|
| 7,030,861 | B1 | 4/2006 | Westerman et al. |
| 7,308,112 | B2 * | 12/2007 | Fujimura et al. ............. 382/103 |
| 7,533,352 | B2 | 5/2009 | Chew et al. |
| 2003/0095154 | A1 | 5/2003 | Colmenarez |
| 2007/0152984 | A1 | 7/2007 | Ording et al. |
| 2007/0177803 | A1 * | 8/2007 | Elias et al. .................... 382/188 |
| 2008/0052643 | A1 | 2/2008 | Ike et al. |
| 2008/0231610 | A1 | 9/2008 | Hotelling et al. |

OTHER PUBLICATIONS

Maung, Tin Hninn Hninn, "Real-Time Hand Tracking and Gesture Recognition System Using Neural Networks", Retrieved at <<http://209.85.229.132/search?q=cache:_vxqfl6QqbUJ:www.waset.org/pwaset/v50/v50-83.pdf+user+interface+gesture+hand+posture+differentiate&cd=7&hl=en&ct=clnk&gl=in>> In the proceedings of the World Academy of Science, Engineering and Technology, vol. 50, Aug. 7, 2009pp. 465-470.

Celentano, et al., "Gestures, Shapes and Multitouch Interaction", Retrieved at <<http://ieeexplore.ieee.org/stamp/stamp.jsp?arnumber=04624705>> In the proceedings of the 19th International Conference on Database and Expert Systems Application,2008, pp. 137-141.

Elezovic, Semir, "Multi Touch User Interfaces", Retrieved at <<http://www.eecs.iu-bremen.de/archive/bsc-2008/elezovic.pdf>> May 9, 2008, pp. 1-24.

Yin, et al., "Hand Posture Recognition in Gesture-Based Human-Robot Interaction", Retrieved at <<http://ieeexplore.ieee.org//stamp/stamp.jsp?tp=&arnumber=04025853>> In the proceedings of Industrial Electronics and Applications, May 24-26, 2006, pp. 6.

Laviola,Jr., Joseph J., "A Survey of Hand Posture and Gesture Recognition Techniques and Technology", Retrieved at <<http://citeseer.ist.psu.edu/cache/papers/cs/32664/ftp:zSzzSzftp.cs.brown.eduzSzpubzSztechreportszSz99zSzcs99-11.pdf/laviola99survey.pdf>> Jun. 1999, pp. 80.

* cited by examiner

*Primary Examiner* — Andrey Belousov

(74) *Attorney, Agent, or Firm* — Alleman Hall McCoy Russell & Tuttle LLP

(57) ABSTRACT

A computing system for displaying a GUI element on a natural user interface is described herein. The computing system includes a display configured to display a natural user interface of a program executed on the computing system, and a gesture sensor configured to detect a gesture input directed at the natural user interface by a user. The computing system also includes a processor configured to execute a gesture-recognizing module for recognizing a registration phase, an operation phase, and a termination phase of the gesture input, and a gesture assist module configured to first display a GUI element overlaid upon the natural user interface in response to recognition of the registration phase. The GUI element includes a visual or audio operation cue to prompt the user to carry out the operation phase of the gesture input, and a selector manipulatable by the user via the operation phase of the gesture.

18 Claims, 4 Drawing Sheets

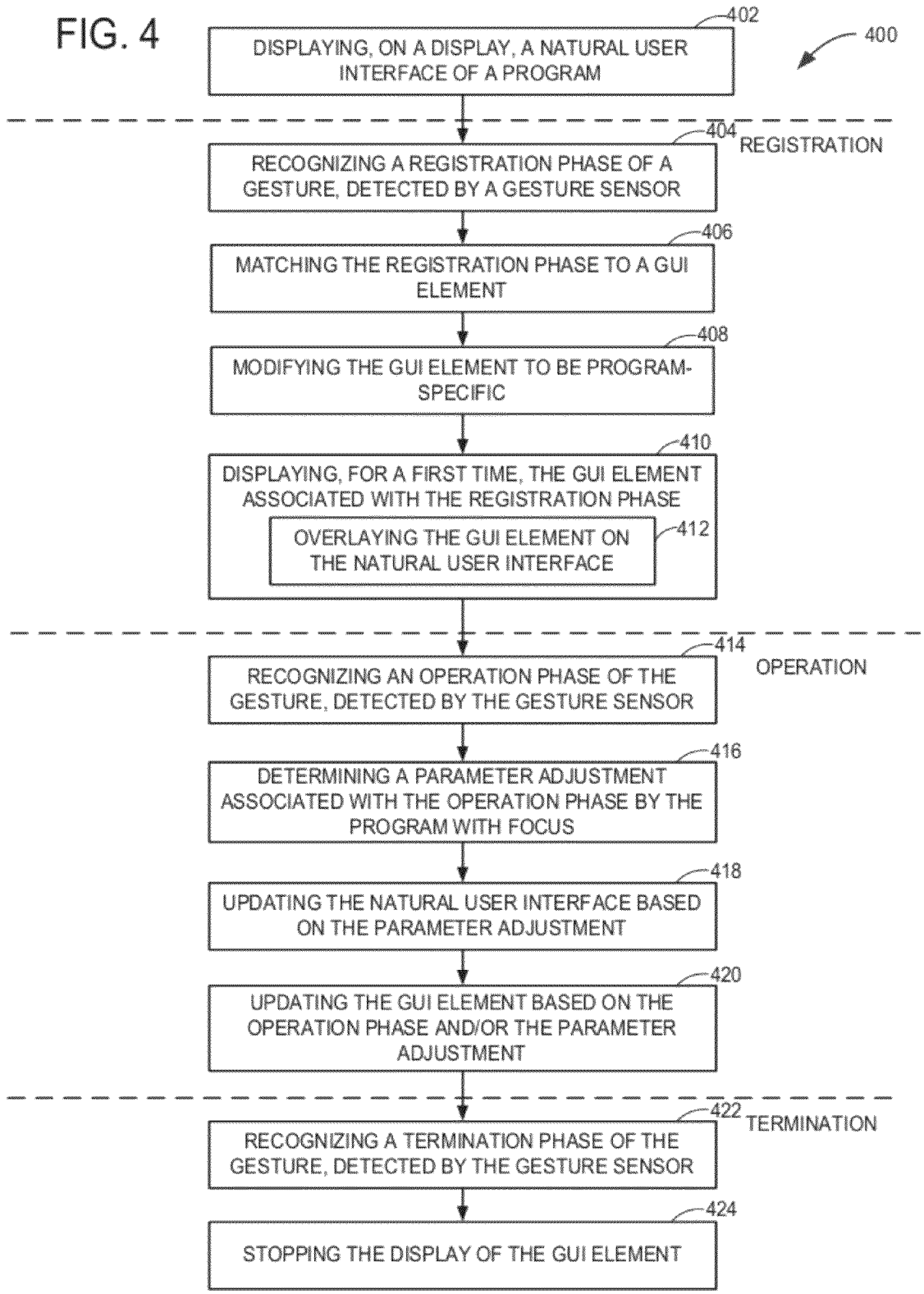

DISPLAYING GUI ELEMENTS ON NATURAL USER INTERFACES

BACKGROUND

A natural user interface is characterized in part by its lack of graphic user interface (GUI) elements, such as toolbars, buttons, sliders, and other selectable graphic features, and by its ability to receive user input by natural input methods, such as gestures. GUI elements are helpful for assisting users to navigate and manipulate a user interface, but GUI elements also limit the viewing area of a user interface. While removal of GUI elements from a natural user interface increases the viewing area and enables direct gesture input by the user, it also removes the visual cues that guide the user during use of traditional GUIs. As a result, particularly when interacting with a natural user interface of a new or complex software program, the user may occasionally become disoriented, and may be unable to efficiently perform gesture input. This could frustrate the user experience, and delay the adoption of natural user interfaces in the marketplace.

SUMMARY

Systems and methods for displaying a GUI element on a natural user interface of a display are described herein. One exemplary computing system includes a display configured to display a natural user interface of a program executed on the computing system, and a gesture sensor configured to detect a gesture input directed at the natural user interface by a user. The computing system also includes a processor configured to execute a gesture-recognizing module for recognizing a registration phase, an operation phase, and a termination phase of the gesture input. The processor is further configured to execute a gesture assist module configured to display a GUI element overlaid upon the natural user interface. The GUI element is first displayed in response to recognition of the registration phase by the gesture-recognizing module, and includes a visual or audio operation cue to prompt the user to carry out the operation phase of the gesture input, and a selector manipulatable by the user via the operation phase of the gesture.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 4 is a flowchart illustrating a method for displaying a GUI element on a natural user interface.

DETAILED DESCRIPTION

Systems and methods for displaying a GUI element on a natural user interface are described herein. Exemplary uses of a natural user interface include two-dimensional and three-dimensional gesture interaction with gesture sensors associated with input devices. As will be described with respect to FIG. 1 and FIG. 2, a user may provide two-dimensional gesture input to a touch-sensitive input device by forming a gesture with the digits of a user's hand. In other examples, a user may gesturally interact with a natural user interface with body parts such as hands, arms, legs, eyes, etc., and the gesture input device may be configured to recognize gestures in a plurality of dimensions (e.g., 1-D, 2-D, 3-D). For example, depth-sensing cameras may detect a user's full-body movement as a gesture input, discussed in detail below.

Figure 1:
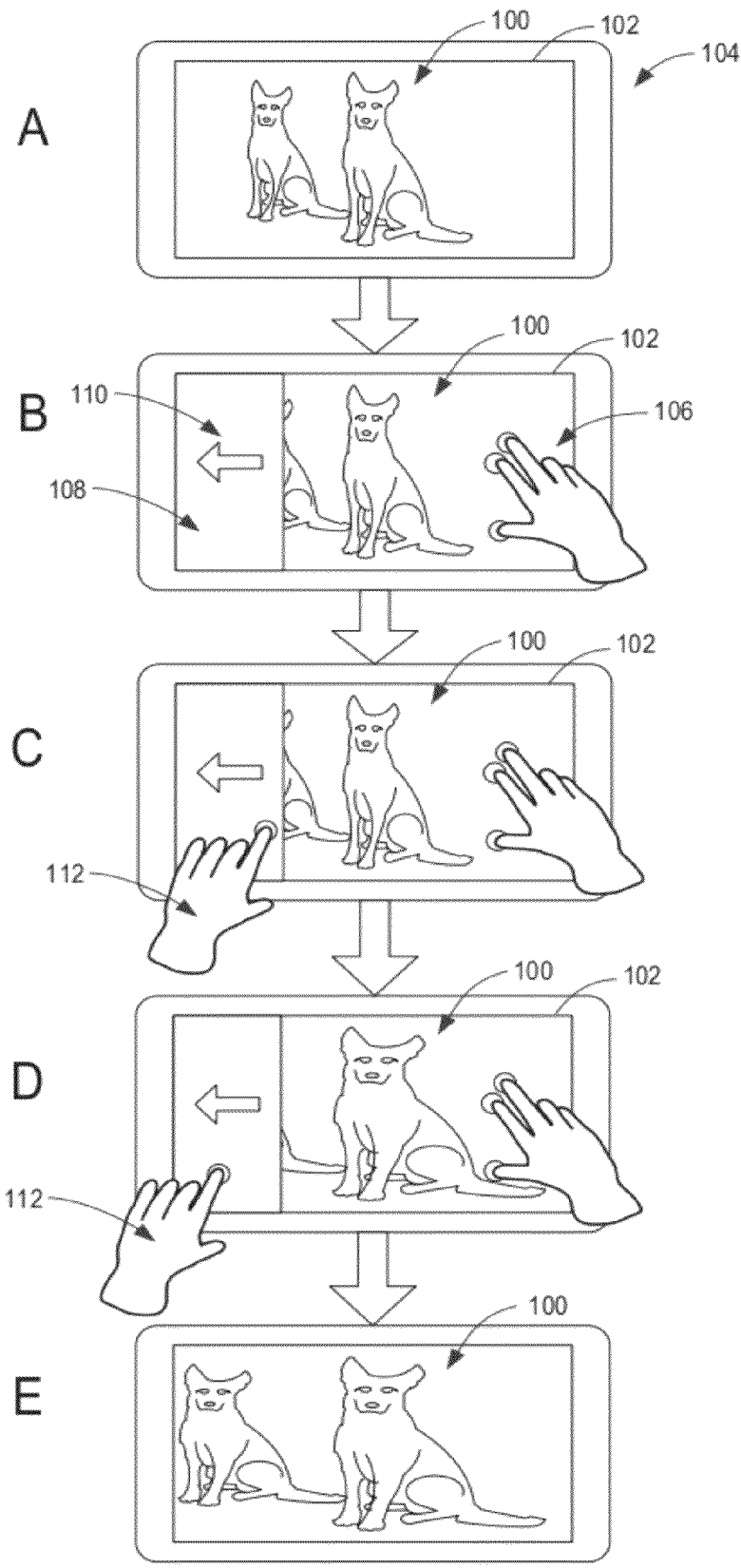
FIG. 1 illustrates an exemplary use of a system for displaying a GUI element on a natural user interface.

Turning now to FIG. 1, an example use of the systems and methods described herein is shown. At A of FIG. 1, a natural user interface 100 is displayed on the display 102 of an input device 104 having a touch-sensitive gesture sensor. As used herein, a natural user interface refers to an interface executed by a program for display on a display with few or no permanent selectable GUI elements (e.g., toolbars, tabs, buttons, sliders, scroll bars, drop down menus, etc.). At A of FIG. 1, the natural user interface 100 is executed by a image editing program, and is shown displaying a picture of two dogs and not displaying any permanent and selectable GUI elements. By using a natural user interface for the image editing program, an amount of viewing area can be maximized to fill the available display space with a photograph, for example.

At B of FIG. 1, a user is shown applying a gesture input 106 to the display 102 with two fingers and a thumb of a hand. Such a gesture input may be recognized as a registration phase of a gesture. The registration phase may be detected by a gesture sensor on the display 102 of the input device 104 and, in response, a GUI element (e.g., side bar 108 and arrow 110) can be displayed on the left-hand side, overlaid upon the natural user interface 100 (e.g., the picture of the two dogs). Here, the GUI element includes a visual operation cue (e.g., the arrow 110) prompting the user to swipe a finger to the left, and the area of the side bar 108 serves as a selector which may be manipulated by the user by finger swiping. Although not shown, the side bar 108 may be configured to change in appearance (e.g., lighten, darken, appear textured, etc.) to further suggest that the user should swipe a finger within the side bar 108.

At C of FIG. 1, the user places a finger of a second hand 112 on the side bar 108. The user performs an operation phase of the gesture input by swiping the finger of the second hand 112 toward the left, as shown at D. Responsive to the operation phase of the gesture input, the natural user interface 100 is updated; and as a result the picture of the two dogs is stretched horizontally. A termination gesture is detected by the gesture sensor at E when the user removes both hands from the input device 104. At E of FIG. 1, the natural user interface 100 remains updated (e.g., stretched) and the GUI element (e.g., side bar 108 and arrow 110) is removed from the display 102.

Figure 2:
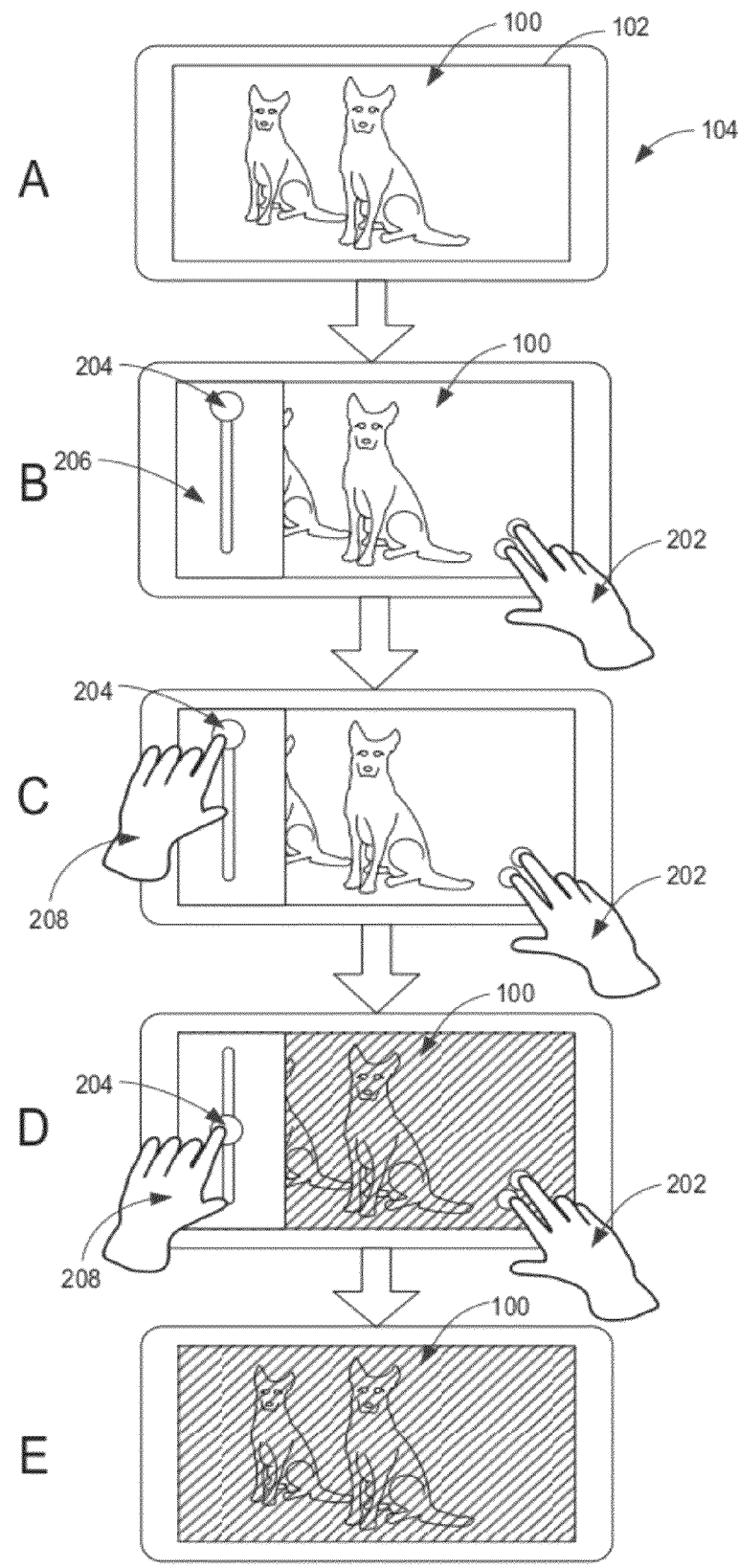
FIG. 2 illustrates a second exemplary use of a system for displaying a GUI element on a natural user interface.

A second example use is shown at FIG. 2, where a user gesturally interacts with the input device 104 to darken the natural user interface 100 showing the picture of the two dogs. At A of FIG. 2, the natural user interface 100 is displayed by a program on the display 102 with few or no permanent GUI elements shown, as in FIG. 1. Specifically, the natural user interface 100 of the image editing program is shown displaying a picture of two dogs with no selectable tabs or buttons at A of FIG. 2.

At B of FIG. 2, placement of two fingers of a user's first hand 202 serves as a registration phase of a gesture input. In response to recognition of the registration phase of the gesture input, a slidable selector 204 on a rail, and a side bar 206 is overlaid upon the natural user interface 100, collectively serving as a GUI element. Here, the rail upon which the slidable selector 204 is slidable serves as a visual operation cue prompting the user to slide the selector along the rail to darken or lighten the natural user interface 100. At C of FIG. 2, the user is shown engaging the slidable selector 204 with the user's second hand 208.

From C to D of FIG. 2, the user slides the slidable selector 204 downward as an operation phase of the gesture. In response, the slidable selector 204 is updated at D of FIG. 2, so as to be shown as having been moved downward with the user's finger of the second hand 208. It may be appreciated that the selector may continuously move with the user's finger during the operation phase of a gesture input. Furthermore, the natural user interface 100 is progressively darkened (indicated by diagonal lines) as the slidable selector 204 is moved downward. In this way, the user receives feedback regarding the user's operation phase of the gesture input. At E of FIG. 2, a termination gesture is recognized by the touch-sensitive gesture sensor by removal of both of the user's hands. In response to the termination gesture, the GUI element (e.g., the slidable selector 204 and side bar 206) is removed from the natural user interface 100, and the natural user interface 100 remains darkened.

As can be appreciated from the examples of FIG. 1 and FIG. 2, the use of gesture input for displaying a GUI element involves an explicit invocation by the user to display the GUI element. Thus, the systems and methods herein provide an advantage of supplying a GUI element when it is desired by a user, and otherwise maintaining a natural user interface that is free of GUI elements.

Figure 3:
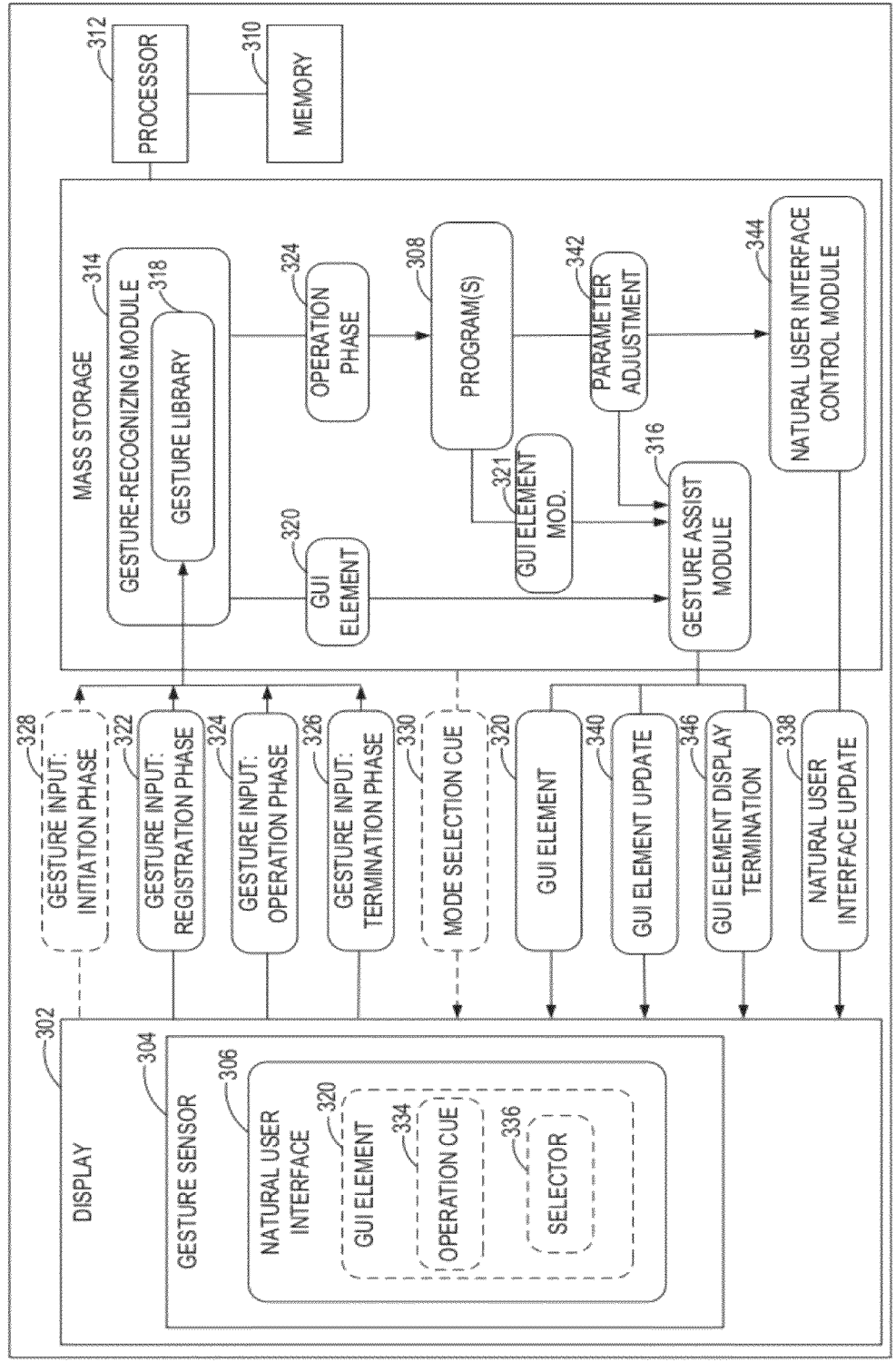
FIG. 3 illustrates a schematic view of a system for displaying a GUI element on a natural user interface.

Turning now to FIG. 3, a computing system 300 for displaying a GUI element 320 on a natural user interface 306 is schematically illustrated. The computing system 300 includes a display 302 configured to display the natural user interface 306 of a program 308 executed on the computing system 300. In this computing system 300, the display 302 also includes a gesture sensor 304 configured to detect a gesture input directed at the natural user interface by a user. As one example, and as described with respect to FIG. 1 and FIG. 2, the display 302 may include, as the gesture sensor 304, a touch-sensitive screen configured to detect a touch gesture input from a user. The touch sensitive screen may, for example, employ resistive, capacitive, infrared, or optical imaging technologies to detect touch on the display 302.

As another example, a gesture sensor may include a depth-sensing camera, which may or may not be co-located with the display 302. The depth-sensing camera may be configured to capture video with depth information via any suitable technique (e.g., time-of-flight, structured light, stereo image, etc.), and/or configured to detect a three-dimensional gesture input from a user. As such, a gesture sensor may include a depth camera, a video camera, stereo cameras, and/or other suitable capture devices. The operational principles of such capture devices are described below.

As one example, in time-of-flight analysis, the capture device may emit infrared light to a target (e.g., a user's body part, or a user's entire body) and may then use sensors to detect backscattered light from the surface of the target. In some cases, pulsed infrared light may be used, wherein the time between an outgoing light pulse and a corresponding incoming light pulse may be measured and used to determine a physical distance from the capture device to a particular location on the target. In some cases, the phase of the outgoing light wave may be compared to the phase of the incoming light wave to determine a phase shift, and the phase shift may be used to determine a physical distance from the capture device to a particular location on the target.

In another example, time-of-flight analysis may be used to indirectly determine a physical distance from the capture device to a particular location on the target by analyzing the intensity of the reflected beam of light over time via a technique such as shuttered light pulse imaging.

In another example, structured light analysis may be utilized by the gesture sensor to capture depth information. In such an analysis, patterned light (i.e., light displayed as a known pattern such as a grid pattern or a stripe pattern) may be projected onto the target (e.g., a user). On the surface of the target, the pattern may become deformed, and this deformation of the pattern may be studied to determine a physical distance from the capture device to a particular location on the target.

In another example, the capture device may include two or more physically separated cameras that view a user from different angles, to obtain visual stereo data. In such cases, the visual stereo data may be resolved to generate a depth image.

In other embodiments, a gesture sensor and related calculation modules may utilize other technologies to measure and/or calculate depth values. Additionally, the gesture sensor may organize the calculated depth information into "Z layers," i.e., layers perpendicular to a Z axis extending from the depth camera along its line of sight to the viewer.

In some embodiments, two or more different cameras may be incorporated into an integrated gesture sensor. For example, a depth camera and a video camera (e.g., RGB video camera) may be incorporated into a common gesture sensor. In some embodiments, two or more separate gesture sensors may be cooperatively used. For example, a depth camera and a separate video camera may be used. When a video camera is used, it may be used to provide gesture tracking data, confirmation data for error correction of gesture tracking, image capture, face recognition, high-precision tracking of fingers (or other small features), light sensing, and/or other functions.

Irrespective of the type of gesture sensor used, the computing system 300 includes memory 310 and a processor 312 for executing a gesture-recognizing module 314, which receives gesture input from the gesture sensor 304. The gesture-recognizing module may be configured to recognize a plurality of phases of a gesture input, such as a registration phase 322, an operation phase 324, and a termination phase 326 of the gesture input. The gesture input may include a multi-touch gesture input (directed at a touch-sensitive gesture sensor), such as the two-finger, one thumb gesture constituting a registration phase, described with respect to FIG. 1. Furthermore, the gesture input may include a multi-hand gesture input, such as those gesture inputs described with respect to C and D of FIG. 1 and C and D of FIG. 2. As discussed above, the gesture input may also be a three-dimensional gesture by a body part as described above, or prop (e.g., a controller).

Once the gesture-recognizing module 314 has detected the registration phase 322, the gesture-recognizing module 314 may match the registration phase 322 of the gesture input detected by the gesture sensor 304 to a GUI element 320 for display on the display 302, according data stored in a gesture library 318. A registration phase 322 may be a particular gesture which has been predefined in the gesture library 318. Although the gesture library 318 is shown here as part of the gesture-recognizing module 314, it may be appreciated that the gesture library 318 may be a separate module and/or may be associated with one or more programs, or the gesture assist module 316, as some examples.

At times, a user may perform a gesture input that does not match a predefined gesture in the gesture library 318. In such a case, this gesture input may be interpreted as an initiation phase 328 of a gesture input by the gesture-recognizing module 314. That is, the user may be attempting to perform a registration phase, but may be performing it incorrectly. In response to recognition of the initiation phase 328, the gesture assist module 316 may be configured to display a mode selection cue 330 to assist a user in performing one of the plurality of predefined registration phases in the gesture library 318. For example, if a user places one finger and a thumb on a touch-sensitive gesture sensor, and that touch input is interpreted as the initiation phase 328, a mode selection cue 330 (e.g., a graphical suggestion, text instructions, etc.) instructing the user to place two fingers and the thumb on the gesture sensor 304 to perform photo stretching (as shown in FIG. 1) may be displayed as overlaid on the natural user interface 306. Any number of mode selection cues may be displayed in response to recognition of the initiation phase 328.

Upon recognition of the registration phase 322 at the gesture-recognizing module 314, the GUI element 320, which is matched to the registration phase 322 by the gesture library 318, may be sent to the gesture assist module 316. Once the gesture assist module 316 receives the GUI element 320 from the gesture-recognizing module 314, the gesture assist module 316 may be configured to specify an appearance and/or a position of the GUI element 320 on the natural user interface 306.

For example, the gesture assist module 316 may be configured to modify the appearance of the GUI element 320 received from the gesture-recognizing module 314 based on a GUI element modification 321 sent from one or more programs 308. As one example, the GUI element modification 321 may cause the appearance of the GUI element sent to the display 302 to be program-specific, for example, by causing the GUI element to have similar aesthetic features (e.g., color, shape, layout) as the aesthetic features of the program 308 that has focus.

The positioning of the GUI element 320 on the natural user interface 306 may be based on a program (e.g., program 308) that has focus on the natural user interface 306. Use of the term "focus" herein refers to a program that is designated by an operating system of the computing system to receive user input from a user input device such as a touch screen, depth camera, keyboard, or mouse connected to the computing system 300. By positioning the GUI element on the natural user interface 306 based on the program 308 that has focus, the positioning of the GUI element 320 can be made to minimally obscure portions of the natural user interface 306 that are most relevant to a user at that time. Thus, the gesture assist module is executable by the processor 312 to send the GUI element 320 to the display 302 to be overlaid on the natural user interface 306.

The GUI element 320 may be first displayed in response to recognition of the registration phase 322 by the gesture-recognizing module 314. That is, the GUI element 320 may not be displayed on the display 302 unless or until the registration phase 322 of a gesture input is recognized. In this manner, the GUI element is not permanently displayed on the natural user interface, and thus does not unduly interfere with the user's interaction with the natural user interface, but rather is presented only after a user has begun to input a recognized gesture, when the user might need assistance to complete the gesture. The GUI element 320 on the display 302 may include a visual operation cue or an audio operation cue (collectively operation cue 334) to prompt a user to carry out the operation phase 324 of the gesture input. Further, the GUI element 320 may include a selector 336 that is manipulatable by a user via the operation phase 324 of the gesture input.

An operation phase 324 may involve a movement of a body part or prop, as described above. In response to recognition of the operation phase 324 of the gesture input at the gesture-recognizing module 314, both a natural user interface update 338 and a GUI element update 340 may be sent to the display 302. As a specific example, when the gesture-recognizing module 314 recognizes the operation phase 324, the operation phase 324 may be sent to the program 308 that has focus, and the program 308 may determine a parameter adjustment 342 associated with the operation phase 324. A natural user interface control module 344, executable by the processor 312, may then update the natural user interface 306 based on the parameter adjustment 342. A parameter adjustment may refer to any change of parameter associated with the operation phase, such as an amount of photo stretching, or a degree of photo darkening if the program in focus is a image editing program. As another example, the parameter adjustment may be an amount of volume change, if the program in focus is a media player program. For an example, see D of FIG. 2, where a picture is darkened responsive to downward movement of the slidable selector 204.

The program 308 that has focus may also send the parameter adjustment 342 to the gesture assist module 316 such that the gesture assist module 316 can update the GUI element 320 to reflect the natural user interface update 338. This is also shown at D of FIG. 2 where the selector is moved with the user's finger as it slides the slidable selector 204 during the operation phase, to thereby reflect a degree of darkening of the natural user interface 306.

Once a user is finished interacting with a GUI element, the user may perform a gesture (e.g., removal of touch input, placing hands at side of body, etc.) to indicate a desired removal of the GUI element from the display 302. Accordingly, the gesture-recognizing module 314 is configured to recognize a termination phase 326 of the gesture input. In response, the gesture assist module 316 is configured to send a GUI element display termination message 346 to the display 302, in response to recognition of the termination phase 326. As described with respect to FIG. 1 and FIG. 2, the GUI element display termination message 346 may cause the GUI element 320 to be hidden or removed while the natural user interface 306 remains unchanged from its previous state (e.g., the natural user interface 306 retains any changes the user has indicated during the operation phase 324).

Turning now to FIG. 4, a flowchart illustrates a method 400 for displaying a GUI element on a natural user interface on a display of a computing system. It will be appreciated that method 400 may be performed using hardware and software components of computing system 300, described above, or other suitable hardware or software components.

First, at 402, the method 400 includes displaying, on a display, a natural user interface of a program executed on a computing system. Thereafter, the flowchart is illustratively broken up into three sections which reflect the three phases of the gesture input (registration, operation, and termination) and their respective associated effects.

At 404, the method 400 may include recognizing a registration phase of a gesture input directed at the natural user interface by a user. As described above, gesture input may be detected by a gesture sensor, such as a touch sensitive screen or a depth camera, and the recognizing may be carried out at a gesture-recognizing module executable by a processor. The gesture input itself may be one, two, or three dimensional, and may include multi-touch gestures.

At 406, the method 400 may include matching the registration phase to a GUI element, by using a gesture library. As shown at 408, in some embodiments, the method 400 may include modifying the GUI element based on a program that has focus such that the GUI element to be overlaid on the natural user interface is program-specific.

Although not shown in FIG. 4, in some cases, the method 400 may include recognizing an initiation phase of a gesture input before recognizing the registration phase and, in response to recognizing the initiation phase, displaying a mode selection cue to assist a user in performing the registration phase.

At 410, the method 400 includes displaying, for a first time the GUI element associated with the registration phase. Herein, "for a first time" refers to the GUI element being displayed in response to an explicit indication by the user (e.g., performance of the registration phase) and the GUI element is not being displayed until or unless that explicit indication is recognized by the gesture-recognizing module. This enables the GUI element to remain hidden or out of view while the user is otherwise interacting with the natural user interface, and be displayed only after the registration phase of a particular gesture is recognized, i.e., at a time when the user may find useful assistance in the form of a visual cue to complete the gesture.

The displaying of the GUI element at 410 may be carried out by a gesture assist module executable by the processor. Furthermore, the displaying includes overlaying the GUI element on the natural user interface at 412 in response to the recognition of the registration phase. As discussed above, the displaying of the GUI element includes specifying a GUI element appearance and/or a GUI element position. The GUI element, as displayed, may include a visual or audio operation cue to prompt the user to carry out the operation phase of the gesture input, and a selector manipulatable by the user via performance of the operation phase of the gesture.

Once the GUI element is displayed at 410, the method 400 may include recognizing an operation phase of the gesture input at the gesture-recognizing module at 414. Thus, at 416, the method 400 may include determining, by a program that has focus, a parameter adjustment associated with the operation phase.

Thereafter, the method 400 may include updating the natural user interface based on the parameter adjustment at 418, in order to provide the user with feedback regarding an effect of the operation phase. The method 400 may further include updating the GUI element at 420 based on the operation phase and/or based on the parameter adjustment to reflect the updating of the natural user interface.

At 422, the method 400 includes recognizing a termination phase of the gesture input, which is also detected by the gesture sensor. In response, the method 400 includes stopping the display of the GUI element overlaid on the natural user interface, at 424.

The above described systems and methods may be employed to enable efficient use of natural user interfaces, particularly for users interacting with new or complex programs having such natural user interfaces, by providing a GUI elements that remain undisplayed during user interaction with the natural user interface, until the user begins a recognized gesture input, at which point an appropriate GUI element containing a visual cue to assist the user in completion of the gesture input is displayed.

It will be appreciated that the computing devices described herein may be any suitable computing device configured to execute the programs described herein. For example, the computing devices may be a mainframe computer, personal computer, laptop computer, portable data assistant (PDA), computer-enabled wireless telephone, networked computing device, or other suitable computing device, and may be connected to each other via computer networks, such as the Internet. These computing devices typically include a processor and associated volatile and non-volatile memory, and are configured to execute programs stored in non-volatile memory using portions of volatile memory and the processor. As used herein, the term "program" refers to software or firmware components that may be executed by, or utilized by, one or more computing devices described herein, and is meant to encompass individual or groups of executable files, data files, libraries, drivers, scripts, database records, etc. It will be appreciated that computer-readable media may be provided having program instructions stored thereon, which upon execution by a processor and/or a computing device, cause the computing device to execute the methods described above and cause operation of the systems described above.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A computing system for displaying a GUI element on a natural user interface on a display, the computing system comprising:
   a display configured to display a natural user interface of a program executed on the computing system;
   a gesture sensor configured to detect a gesture input directed at the natural user interface by a user; and
   a processor configured to execute:
      a gesture-recognizing module configured to recognize a registration phase, an operation phase, and a termination phase of the gesture input;
      a gesture assist module configured to display a GUI element overlaid upon the natural user interface, the GUI element being first displayed in response to recognition of the registration phase by the gesture-recognizing module, and including a visual or audio operation cue to prompt the user to carry out the operation phase of the gesture input, and a selector manipulatable by the user via the operation phase of the gesture;
      where upon receiving user input via the selector the gesture-recognizing module is configured to send the operation phase to the program, and the program is configured to determine a parameter adjustment based upon the user input received in the operation phase;
      where the processor is further configured to execute a natural user interface control module configured to perform a natural user interface update responsive to recognition of the operation phase and based on the parameter adjustment determined by the program;
      where the gesture assist module is further configured to receive the parameter adjustment from the program and perform a GUI element update based on the parameter adjustment; and
      where the natural user interface update and GUI element update are sent to the display.

2. The computing system of claim 1, where the gesture-recognizing module includes a gesture library for matching the registration phase of the gesture input to the GUI element.

3. The computing system of claim 2, where the gesture assist module is configured to specify an appearance and/or a position of the GUI element for display.

4. The computing system of claim 3, where the gesture assist module is configured to specify the position of the GUI element based on a program that has focus.

5. The computing system of claim 3, where the gesture assist module is further configured to specify the appearance of the GUI element based on a program that has focus such that the GUI element is program-specific.

6. The computing system of claim 1, where the gesture sensor includes a touch screen configured to detect a touch input from a user.

7. The computing system of claim 6, where the gesture recognizing module is configured to recognize a multi-touch gesture input.

8. The computing system of claim 7, where the gesture sensor includes a depth-sensing camera configured to detect a three-dimensional gesture input from a user.

9. A method for displaying a GUI element on a natural user interface on a display, the method comprising:
  displaying, on a display, a natural user interface of a program executed on the computing system;
  recognizing, at a gesture-recognizing module executable by a processor, a registration phase of a gesture input directed at the natural user interface by a user;
  displaying a GUI element associated with the registration phase for a first time, by a gesture assist module executable by the processor, the displaying including overlaying the GUI element upon the natural user interface in response to the recognition of the registration phase, and the GUI element including a visual or audio operation cue to prompt the user to carry out an operation phase of the gesture input, and a selector manipulatable by the user via performance of the operation phase of the gesture input;
  recognizing the operation phase of the gesture input at the gesture-recognizing module;
  updating the natural user interface, responsive to recognition of the operation phase, to provide the user with feedback regarding an effect of the operation phase;
  where, upon receiving user input via the selector, the gesture-recognizing module is configured to send the operation phase to the program, and the program is configured to determine a parameter adjustment based upon the user input received in the operation phase;
  where the processor is further configured to execute a natural user interface control module configured to perform a natural user interface update responsive to recognition of the operation phase and based on the parameter adjustment determined by the program;
  where the gesture assist module is further configured to receive the parameter adjustment from the program and perform a GUI element update based on the parameter adjustment; and
  where the natural user interface update and GUI element update are sent to the display.

10. The method of claim 9, further comprising matching the registration phase of the gesture input to a GUI element using a gesture library at the gesture-recognizing module, responsive to recognizing the registration phase.

11. The method of claim 10, where displaying the GUI element includes specifying a GUI element appearance and/or a GUI element position.

12. The method of claim 9, further comprising determining a parameter adjustment associated with the operation phase by the program, where the updating of the natural user interface is based on the parameter adjustment.

13. The method of claim 12, further comprising updating the GUI element based on the operation phase to reflect the updating of the natural user interface.

14. The method of claim 12, further comprising modifying the GUI element based on a program that has focus such that the GUI element overlaid on the natural user interface is program-specific.

15. The method of claim 9, further comprising recognizing a termination phase of the gesture input, and in response, stopping the display of the GUI element.

16. The method of claim 9, further comprising recognizing an initiation phase of the gesture input before recognizing the registration phase and, in response to recognizing the initiation phase, displaying a mode selection cue to assist a user in performing the registration phase.

17. A computer-readable medium having instructions stored thereon that are executable by a processor to:
  display, on a display, a natural user interface of a program executed on the computing system;
  recognize, at a gesture-recognizing module, a registration phase of a gesture input directed at the natural user interface by a user;
  display a GUI element associated with the registration phase for a first time, by a gesture assist module, the displaying including overlaying the GUI element upon the natural user interface in response to the recognition of the registration phase, and the GUI element including a visual or audio operation cue to prompt the user to carry out an operation phase of the gesture input, and a selector manipulatable by the user via performance of the operation phase of the gesture input;
  recognize the operation phase of the gesture input at the gesture-recognizing module;
  update the natural user interface, responsive to recognition of the operation phase, to provide the user with feedback regarding an effect of the operation phase;
  where, upon receiving user input via the selector, the gesture-recognizing module is configured to send the operation phase to the program, and the program is configured to determine a parameter adjustment based upon the user input received in the operation phase;
  where the processor is further configured to execute a natural user interface control module configured to perform a natural user interface update responsive to recognition of the operation phase and based on the parameter adjustment determined by the program;
  where the gesture assist module is further configured to receive the parameter adjustment from the program and perform a GUI element update based on the parameter adjustment; and
  where the natural user interface update and GUI element update are sent to the display.

18. The computer-readable medium of claim 17, wherein displaying of the GUI element includes specifying a GUI element appearance and/or a GUI element position based on a program that has focus.

* * * * *